(12) United States Patent
Olsen (10) Patent No.: US 11,784,403 B2
(45) Date of Patent: Oct. 10, 2023

(54) ANTENNA ARRAY AND A PHASED ARRAY SYSTEM WITH SUCH ANTENNA ARRAY

(71) Applicant: SAAB AB, Linköping (SE)

(72) Inventor: Terje Sparre Olsen, Oslo (NO)

(73) Assignee: SAAB AB, Linköping (SE)

( * ) Notice: Subject to any disclaimer, the term of this patent is extended or adjusted under 35 U.S.C. 154(b) by 183 days.

(21) Appl. No.: 17/601,040

(22) PCT Filed: Apr. 3, 2020

(86) PCT No.: PCT/SE2020/050350
§ 371 (c)(1),
(2) Date: Oct. 1, 2021

(87) PCT Pub. No.: WO2020/204805
PCT Pub. Date: Oct. 8, 2020

(65) Prior Publication Data
US 2022/0166135 A1    May 26, 2022

(30) Foreign Application Priority Data
Apr. 3, 2019    (NO) .................................... 20190454

(51) Int. Cl.
*H01Q 13/10*    (2006.01)
*H01Q 21/00*    (2006.01)
(Continued)

(52) U.S. Cl.
CPC ................. *H01Q 3/04* (2013.01); *H01Q 3/22* (2013.01); *H01Q 13/10* (2013.01)

(58) Field of Classification Search
CPC ...... H01Q 13/10; H01Q 21/00; H01Q 21/005; H01Q 3/00; H01Q 3/04; H01Q 3/06; H01Q 3/22; H01Q 3/24; H01Q 3/26; H01Q 3/30
See application file for complete search history.

(56) References Cited

U.S. PATENT DOCUMENTS 3,893,124 A * 7/1975 Barker .................. G01S 13/422
                                                        342/368
4,119,972 A * 10/1978 Fletcher ................. H01Q 3/385
                                                        342/371
(Continued)

FOREIGN PATENT DOCUMENTS

EP    0474977 A2    3/1992
EP    1580572 A1    9/2005
(Continued)

OTHER PUBLICATIONS

International Search Report and Written Opinion dated Jun. 16, 2020 for International Application No. PCT/SE2020/050350, 14 pages.
(Continued)

*Primary Examiner* — Tho G Phan
(74) *Attorney, Agent, or Firm* — SAGE PATENT GROUP (57) ABSTRACT

Antenna array and phased array system including a first and second antenna group, wherein the first antenna group includes two or more first antennas, and the second antenna group includes two or more second antennas, where in a first plane the one or more first and second antennas point in the same direction, and in a second plane, perpendicular to the first plane the one or more first antennas of the first antenna group are squinted by orientation away from the one or more second antennas of the second antenna group.

17 Claims, 6 Drawing Sheets

(51) Int. Cl.
H01Q 3/04 (2006.01)
H01Q 3/22 (2006.01)

(56) References Cited

U.S. PATENT DOCUMENTS

| | | | |
|---|---|---|---|
| 4,843,402 A * | 6/1989 | Clement | H01Q 21/08 343/758 |
| 4,958,166 A | 9/1990 | Branigan et al. | |
| 5,223,850 A * | 6/1993 | Branigan | H01Q 25/02 343/771 |
| 6,124,833 A * | 9/2000 | Bialkowski | H01Q 21/0012 343/770 |
| 6,867,726 B1 | 3/2005 | Yu et al. | |
| 6,873,301 B1 * | 3/2005 | Lopez | H01Q 1/32 343/754 |
| 7,038,620 B1 | 5/2006 | Chubb, Jr. et al. | |
| 9,935,365 B2 * | 4/2018 | Chen | H01Q 13/18 |
| 10,247,815 B1 | 4/2019 | Koubiadis et al. | |
| 11,264,729 B2 * | 3/2022 | Hand | H01Q 3/2658 |
| 2002/0169578 A1 | 11/2002 | Yang | |
| 2003/0043085 A1 | 3/2003 | Park et al. | |
| 2005/0146476 A1 | 7/2005 | Wang et al. | |
| 2007/0069966 A1 | 3/2007 | Rolnik | |
| 2010/0099370 A1 | 4/2010 | Nichols et al. | |
| 2013/0088381 A1 | 4/2013 | Puzella et al. | |
| 2016/0131738 A1 | 5/2016 | Prechtel et al. | |
| 2016/0291144 A1 | 10/2016 | Chang et al. | |
| 2018/0131102 A1 | 5/2018 | Wang | |

FOREIGN PATENT DOCUMENTS

| | | |
|---|---|---|
| EP | 2416447 A2 | 2/2012 |
| EP | 3109939 A1 | 12/2016 |
| GB | 2556032 A | 5/2018 |

OTHER PUBLICATIONS

International Preliminary Report on Patentability dated Apr. 23, 2021 for International Application No. PCT/SE2020/050350, 19 pages.

Norwegian Search Report dated Oct. 31, 2019 for Norwegian Patent Application No. 20190454, 2 pages.

Extended European Search Report dated Nov. 3, 2022 for European Patent Application No. 20782867.4, 10 pages.

Chang, Dau-Chryh et al.; "On Development of a Hybrid Mode Scanning Phased Array Antenna"; Proceedings of the Antennas and Propagation Society International Symposium (APSIS), New York, Jun. 18, 1992; 4 pages.

* cited by examiner

ANTENNA ARRAY AND A PHASED ARRAY SYSTEM WITH SUCH ANTENNA ARRAY

CROSS-REFERENCE TO RELATED APPLICATIONS

This application is a 35 U.S.C § 371 national stage application for International Application No. PCT/SE2020/050350, entitled "ANTENNA ARRAY AND A PHASED ARRAY SYSTEM WITH SUCH ANTENNA ARRAY", filed on Apr. 3, 2020, which itself claims priority to Norwegian Patent Application No. 20190454, entitled "ANTENNA ARRAY AND A PHASED ARRAY SYSTEM WITH SUCH ANTENNA ARRAY", filed on Apr. 3, 2019, the disclosures and contents of which are hereby incorporated by reference in their entireties.

TECHNICAL FIELD

The present invention relates to antenna arrays, and more particularly to phased array antenna systems. Such antennas may be used for e.g., imaging, testing, wireless communication and radar systems.

BACKGROUND

Directive antennas for microwaves have been known for a long time. In 1951 U.S. Pat. No. 25,737 was granted for a directive antenna that was directed towards radar systems applications, disclosing the slotted waveguide.

The slotted waveguide emits linearly polarized radio waves directly through the slots, which have to be spaced apart according to the wavelength used.

The position, shape and orientation of the slots determine the radiation pattern, which in addition is influenced by the shape of the waveguide and the frequency of operation.

Phased array antennas are used to create controlled beams of radio waves. The beam can in this way be pointed in different directions by changing the phase of the individual antennas in the antenna array. This will in turn change the interference pattern of the antennas in the antenna array. In this way the direction of the boresight, resulting from constructive interference, can be changed without turning the antenna array mechanically.

Phased arrays are generally the antenna architecture of choice for most modern high performance radar and communication systems. They are also used in ultrasonic testing for medical imaging and industrial non-destructive testing to test manufactured materials, such as welds.

Phased arrays consist of an array of individual antennas that are geometrically arranged and phased to provide the desired radiation characteristics.

Monopulse is a technique to implement parallel receiver antennas for angle measurements. In passive antennas, monopulse is normally realized by using feed horns with multiple receivers. In active antennas this is done with analog or digital beam formers. Analog beam formers consist of weighted summation networks. In digital beam formers, weighted summation is done in digital hardware/software.

In microwave technology, the individual elements are in general connected by a system of microwave transmission lines and a beamformer. The beamformer network can itself be large and heavy if there are many elements, since the physical characteristics of the beamformer are determined by the wavelength the antenna is designed for.

In analog beamforming, the carrier is modulated with a baseband signal. The modulated signal is split up using a power divider. Each of the split signals are then passed through a beamformer where amplitude and/or phase variations are applied. The power divider will need a branch for each antenna in the antenna array, and the power into each beam splitter will therefore be reduced accordingly.

At the receive end, the signals from the individual antennas are given individual complex weight in the beamformers to apply amplitude and/or phase variations, before they are combined in a power combiner to form a radio signal with directional properties that is fed into the radio receiver. This means that they are combined at the carrier frequency level. Thus, complex weight is given at the radio frequency level.

Digital beamforming is performed at the individual level, i.e. on individual antenna elements or sub array elements. Each individual received signal is converted to digital format in A/D converters and then down converted to individual complex baseband signals. Complex weight, i.e. amplitude and phase is then applied to each of these complex signals, before they are summed up to a complex baseband signal that is sent to the demodulator of the receiver, where the information in the signal is retrieved. In digital beamforming, complex weight is given to a digital signal at the baseband level.

Beamforming and the use of microwave analog integrated circuits (MMIC) have resulted in active electronically scanned arrays (AESA) which are computer controlled array antennas where each antenna element or sub antenna element is connected to individual solid-state transceiver modules.

In an AESA, each antenna element is connected to its own transmit/receive module (TRM) controlled from a computer. As a result, each individual antenna element can receive and/or transmit at a different frequency. In addition, the direction of the beam can be steered very quickly, and the transceiver modules can co-operate to complete several scans simultaneously.

A radar making use of a two dimensional AESA system can capture a coherent profile of the target, both for azimuth and elevation.

However, two-dimensional AESA systems with a large number of individual antenna elements and corresponding transceiver modules tend to become very complex and expensive.

One of the main cost drivers ASEA's are the transmit elements. It has been proposed to reduce the cost by randomly reducing the number of transmit elements.

However, this reduces the gain and power of the antenna and degrades side lobe performance. Accordingly, it is difficult to have low cost, lightweight two-dimensional performance using an AESA.

International patent application WO2006033767 A1 discloses an active electronically scanned array system proposing to mitigate the above problem by forming a receive beam width that is less than the transmit beam width.

SHORT SUMMARY

A goal with the present invention is to disclose a low cost, low weight antenna array that can be applied in phased array systems to achieve angular measurements of an object in two perpendicular directions.

The invention solving the above-mentioned problems is an antenna array and a phased array antenna system as defined in the independent claims.

The invention allows construction of a cost effective and versatile antenna that can be applied for angular measurements of an object in two perpendicular directions, such as a full monopulse antenna.

Range and accuracy can be increased in the direction perpendicular to the phased array steered beam by simple means, due to increased coherent illumination time and pointing transmission beam directly at target.

For radars, the radar cross-section (RCS) errors can be reduced, since RCS variations with frequency and time do not induce errors in one direction.

BRIEF DESCRIPTION OF THE DRAWINGS

In FIG. 4a the first antennas (11) are interleaved with the second antennas (21). In FIG. 4b the first and second antennas (11, 21) are arrange adjacent each other, respectively. In FIG. 4c the first and second antennas (11, 21) are randomly arranged.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations.

Rather, the scope of the invention is defined in the appended claims.

Figure 1:
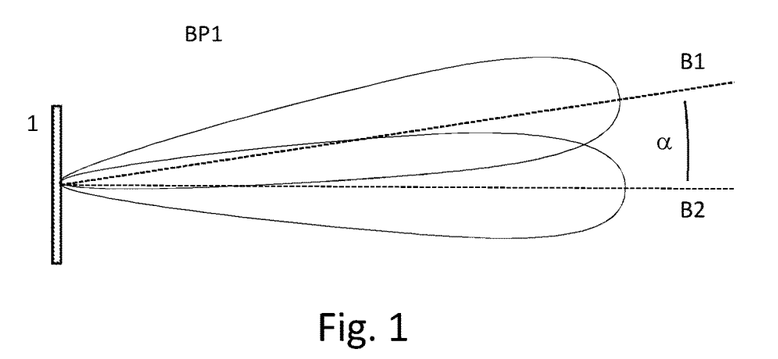
FIG. 1 illustrates in a plane, an antenna array (1) with two antenna lobes and corresponding broad sides (B1, B2). The two broad sides originate from different sub-antennas of the antenna array. The boresights deviate from each other with an angle (a).

In a first embodiment illustrated in FIG. 1, the invention is an antenna array (1) comprising first and second sub-antennas (10, 20) with respective first and second boresights (B1,B2), wherein the first sub-antenna (10) comprises two or more first antennas (11), and the second sub-antenna (20) comprises two or more second antennas (21), wherein a first boresight plane (BP1), the first boresight (B1) is tilted away from the second boresight (B2).

Figure 2:
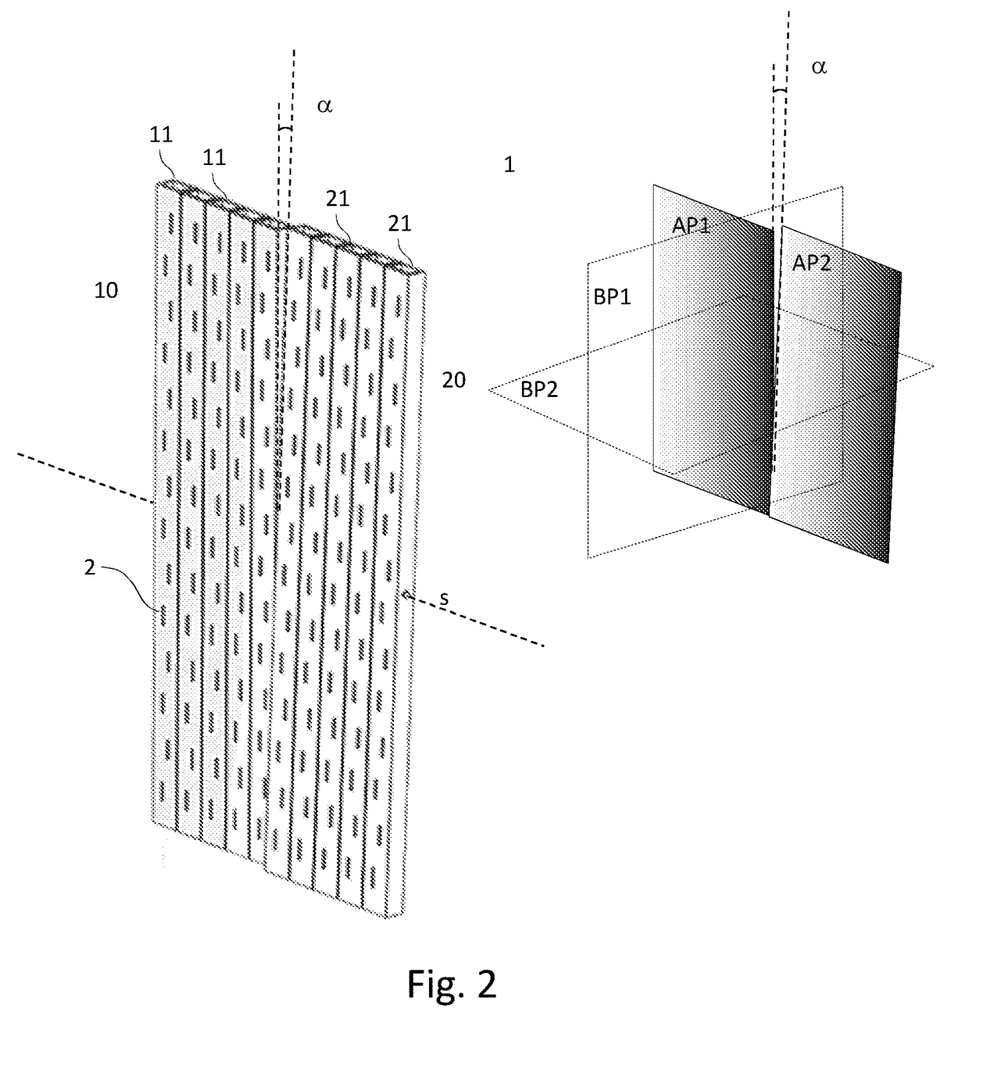
FIG. 2 shows in a perspective view an embodiment of an antenna array (1) according to the invention. The antenna array (1) comprise first and second sub-antennas (10, 20). Each sub-antenna comprises four slotted waveguide antennas (11, 21). The slotted waveguide antennas (11) in the first sub-antenna (11) are tilted an angle (a) away from the slotted waveguides (21) in the second sub-antenna (20), and considering that the slotted waveguides have similar physical properties, the first and second sub-antennas will have diverging broad sides determined by the angle (a) as illustrated in FIG. 1.

In a second embodiment that may be combined with embodiment 1, the two or more first antennas (11) are planar in a first antenna plane (AP1) and the two or more second antennas (11) are planar in a second antenna plane (AP2), wherein the first antenna plane (AP1) is tilted relative to the second antenna plane (AP2). FIG. 2 illustrates both a physical embodiment of the invention to the left, and the first and second antenna planes to the right. The planes may be tilted relative each other about a common axis (s), or in any other location.

As an alternative to the tilted antenna planes (AP1, AP2), the first antennas (11) may be slightly mechanically modified with regard to the second antennas (21) to obtain the relative tilted boresights (B1, B2) with both the first and the second antennas residing in the same plane. The mechanical difference could e.g. be related to a different or varying cross section of the antenna, or any other difference resulting in a different boresight angle.

Figure 4A:
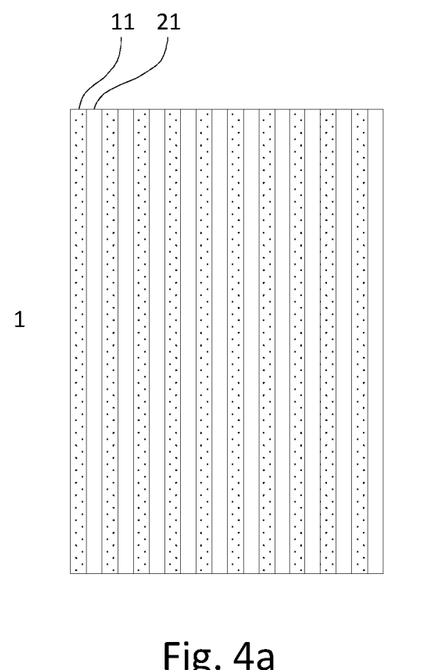
FIGS. 4a, 4b and 4c illustrate some possible individual arrangements of the slotted waveguides of the antenna array (1) in simplified front views not showing the slots. The second antennas (21) have been marked with a pattern to distinguish them from the first antennas (11).
Figure 4B:
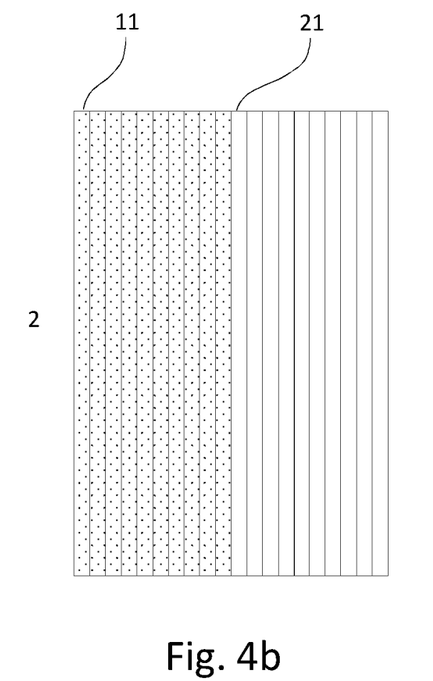
Figure 4C:
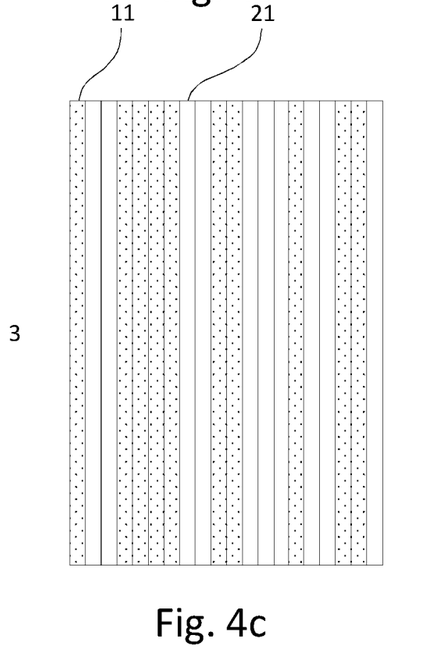

Independent of whether the antennas are in different planes or have different geometry, the two or more first antennas (11) may be arranged interleaved with the two or more second antennas (21) as seen in FIG. 4a. Alternatively, the two or more first antennas (11) in the first sub-antenna (10) and the two or more second antennas (21) in the second sub-antenna (20) may be arranged adjacent each other, respectively, as can be seen from FIG. 4b, or randomly as seen in FIG. 4c. As described above, the first and the second antennas will be tilted relative each other.

The first boresight (B1) may in an embodiment be tilted away from the second boresight (B2) a squint angle (a) larger than 0 degree. In related embodiments the squint angle (a) is between a smaller angle of 0.001, 0.005, 0.01 or 0.02 degree, and a larger angle of 1 degree.

Since the invention is related to the physical properties of the antenna, the first boresight plane (BP1) may be in any direction. In specific applications, the boresight plane (BP1) may be the elevation plane, but it could as well be the azimuth plane or a plane parallel to the earth's surface.

In an embodiment that may be combined with any of the embodiments above, the first antennas (11) are slot antennas.

In a related embodiment, the one or more first antennas (11) are slotted waveguide antennas, each with two or more slots (2). Slotted waveguide antennas are easy to make, they have a high efficiency and they have a linear polarization with low cross-polarization.

In the embodiments with slotted waveguide antennas where the boresight plane (BP1) is the elevation plane, the slot antennas may be horizontally polarized.

In embodiments that may be combined with the embodiments above, the slotted waveguide antennas may be end-fed.

In a fourth embodiment the invention is a phased array antenna system (100) comprising an antenna array (1)

according to any of the embodiments above. In addition to the antenna array, the antenna system comprises a beam former (110) connected to each of said two or more first antennas (11) and two or more second antennas (12).

In a related embodiment, the beam former (110) is arranged to feed each of said two or more first antennas (11) and two or more second antennas (12) with a transmit signal with a common transmit frequency.

The beamformer (110) may be an analog or a digital beamformer.

In a fifth embodiment that may be combined with the fourth embodiment, the two or more first and second antennas (11, 12) are longitudinal slotted waveguide antennas, where a duplexer (120) is connected to each of the slotted waveguide antennas and the beamformer (110) is connected to two or more first and second antennas (11, 12) via the the duplexers (120). The duplexers may be e.g. a circulators or a transmit/receive switches.

The slotted waveguide antennas may in an embodiment be end-fed.

The phased array antenna system (100) may be described as a Passive Electronic Steered Array (PESA) in the first boresight plane (BP1) and an Active Electronic Steered Array (AESA) in a second boresight plane (BP2) orthogonal to the first boresight plane (BP1). It can therefore be seen as a hybrid antenna system.

The phased array antenna system (100) above enables monopulse reception both in the first boresight plane (BP1) and the second boresight plane (BP2), e.g. in the elevation and azimuth planes.

In a sixth embodiment that may be combined with any of the embodiments 4 or 5 above, the beam former is configured to vary the transmit frequency to alter the direction of the first and second boresights (B1, B2) in the first boresight plane (BP1).

In a seventh embodiment that will be explained with reference to FIG. 3, the phased array antenna system (100) is a hybrid antenna system.

Here the antenna system is a Passive Electronic Steered Array (PESA) in the first boresight plane (BP1), and an Active Electronic Steered Array (AESA) in a second boresight plane (BP2) orthogonal to the first boresight plane (BP1). In this example, the first boresight plane (BP1) is the elevation plane (vertical) and the second boresight plane (BP2) is the azimuth plane (horizontal).

The antenna array (1) comprises first and second sub-antennas (10, 20) with respective first and second boresights (B1, B2), wherein the first and second sub-antennas (10, 20) comprises two or more slotted waveguide antennas (11), respectively.

In this embodiment, the slotted waveguide antennas in the first and second sub-antennas (10, 20) are arranged in two separate planes that are tilted relative each other. The physical tilt will result in a corresponding tilt between the first and second boresights (B1, B2) of the two sub-antennas (10, 20) in the elevation plane.

Each slotted waveguide is a PESA. The beam in the first boresight plane (BP1), here elevation, is here controlled by the frequency of the transmit signal.

In monopulse systems, a receive signal is compared with the known transmit signal, i.e. typically by a scanning radar comparing the return signal from two directions to measure the location of a target. The transmit signal is pulsed, allowing use of the same antenna to receive the reflected signal between the pulses.

In the receive direction, the output from each slotted waveguide antenna contributes as input to a one-dimensional active antenna array.

The beam and boresight in the second boresight plane (BP2) is controlled by digital beam formers well known in the art.

In the transmit direction the digital signal to each of the slotted waveguide antennas (11, 12) is converted to an analogue signal in a Digital to Analog Converter (DAC). This analogue signal modulates the radio frequency signal and is amplified in a Power Amplifier (PA) before it is fed into the slotted waveguide antenna (11, 12) via a circulator (120).

In the receive direction a reflected signal is received by the slotted waveguide antenna (11, 12) amplified in a Low Noise Amplifier (LNA) after being passed through the circulator (120) in the opposite direction of the transmit signal, and demodulated before converted into digital form in Analogue to Digital Converter (DAC). The digital signal is input to the Digital Beamformer (110).

Figure 5:
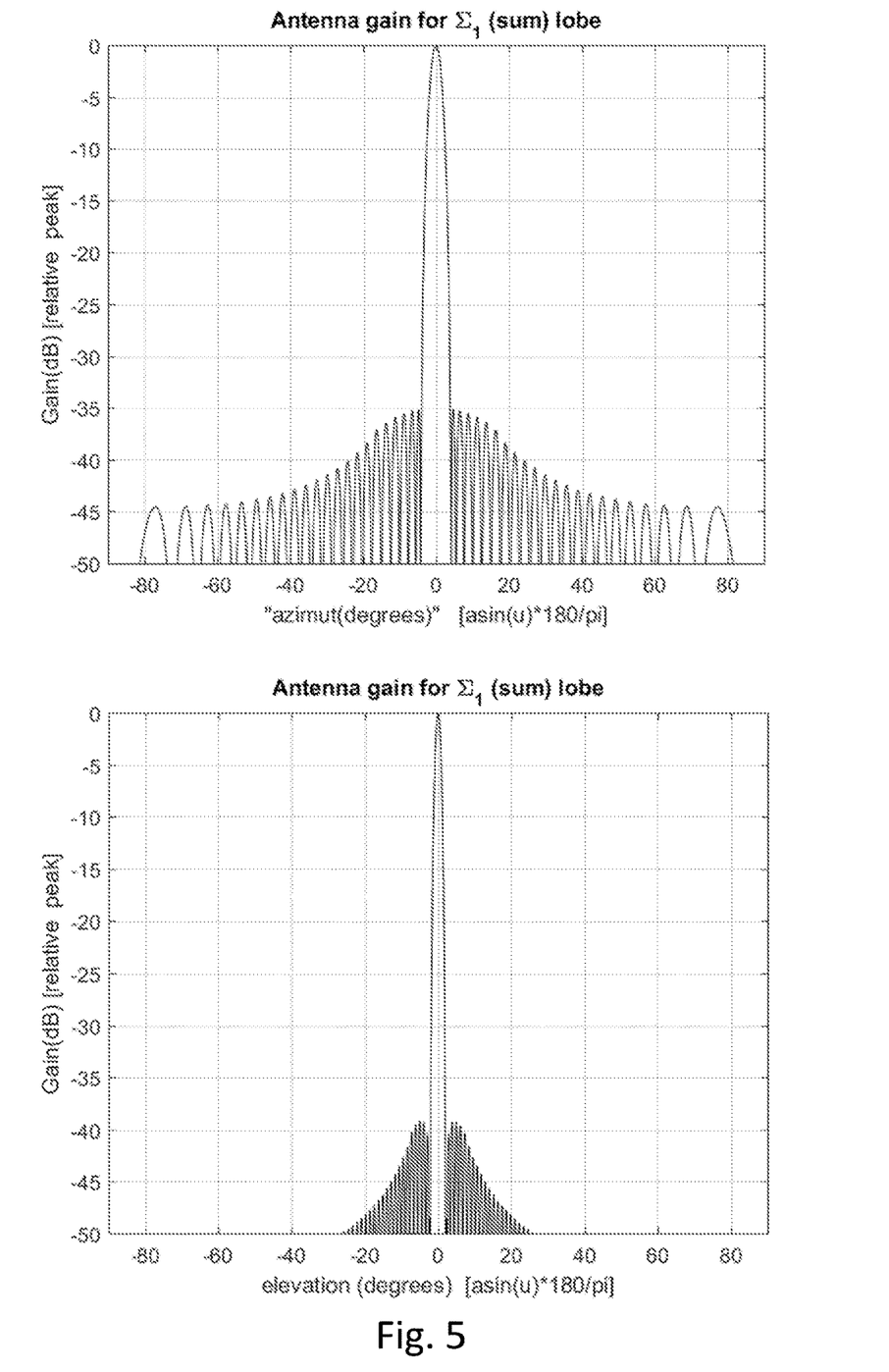
FIG. 5 illustrates in a graph, antenna gain for the sum lobe in the azimuth (upper) and elevation (lower) directions for an antenna system according to an embodiment of the invention. The antenna array (1) is arranged vertically as in FIG. 3.
Figure 6:
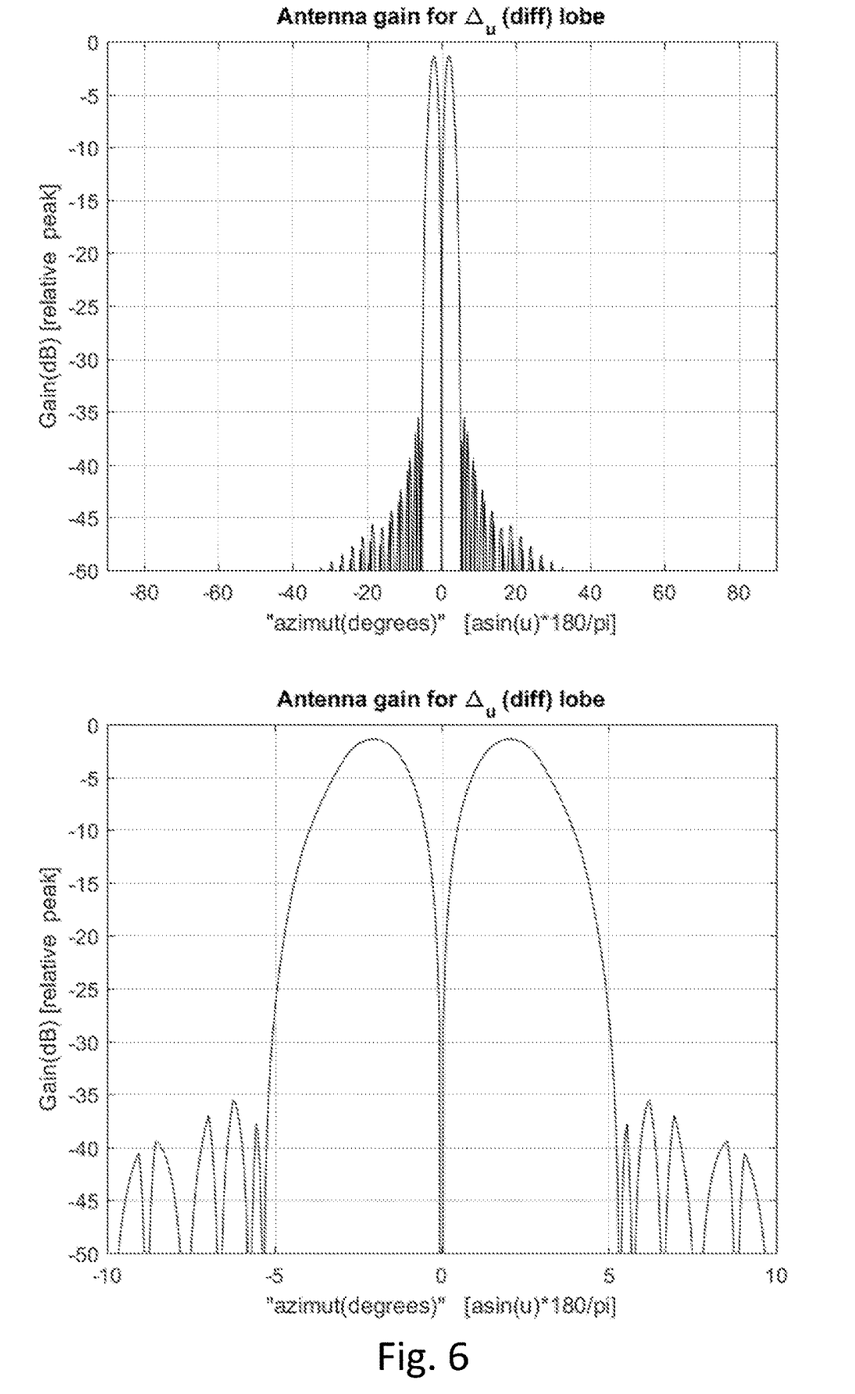
FIG. 6 illustrates in a graph, antenna gain for the differential lobe in the elevation direction for an antenna system according to an embodiment of the invention. The antenna array (1) is arranged vertically as in FIG. 3.
Figure 7:
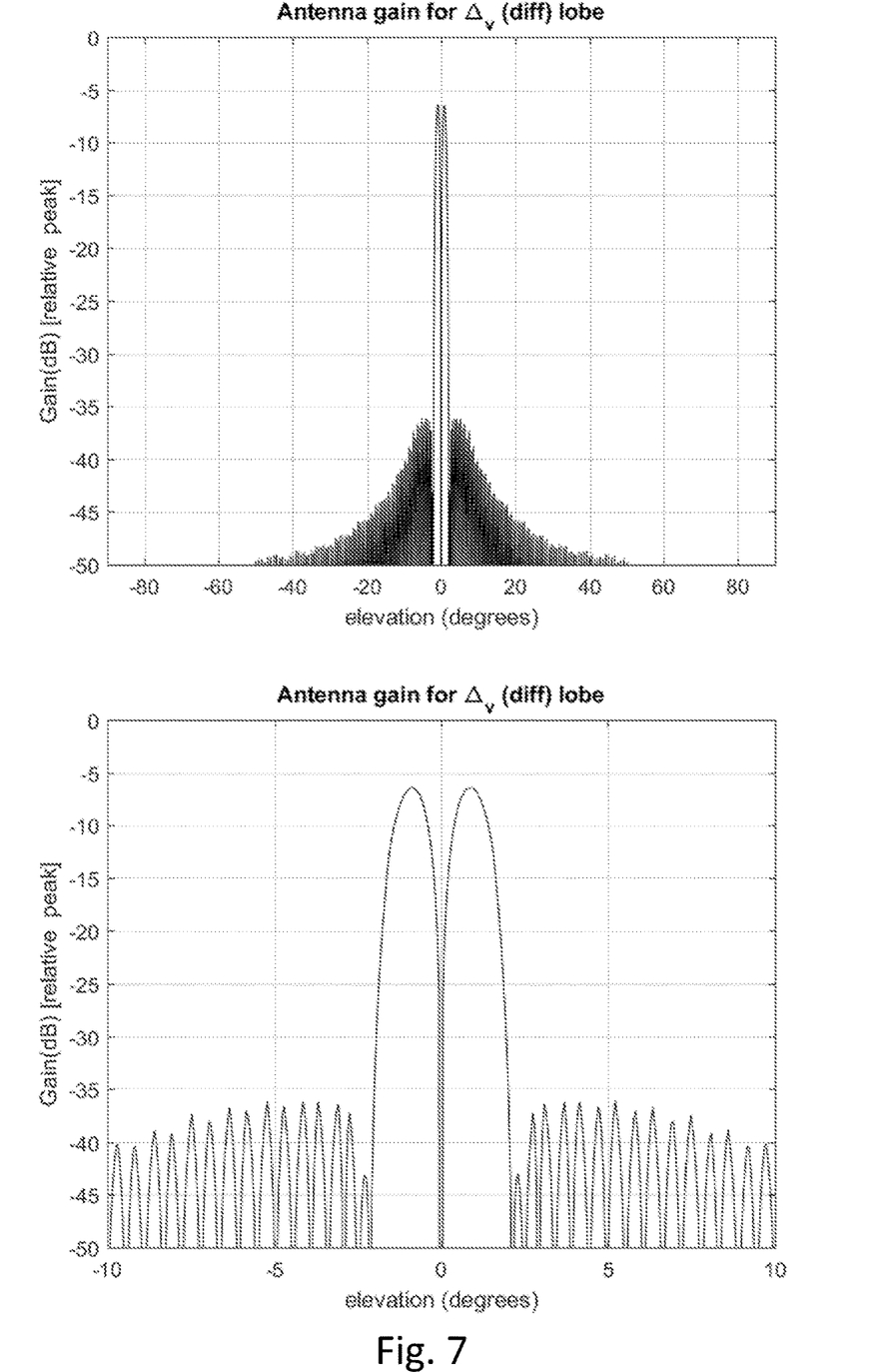
FIG. 7 illustrates in a graph, antenna gain for the differential lobe in the azimuth direction for an antenna system according to an embodiment of the invention. The antenna array (1) is arranged vertically as in FIG. 3.

In the Digital Beamformer (110) all the individual digital signals can be combined to obtain antenna gain for summary lobe (E) and for the difference lobes El($\Delta$u), Az($\Delta$v), in the elevation and azimuth directions, as seen in FIGS. 5 to 7.

The antenna system will therefore consist of two orthogonal antenna arrays combined giving a 2-dimensional steered array.

Thus, by splitting the antenna array into two sub-antennas, in combination with a beamformer, a full monopulse antenna system is achieved.

Figure 3:
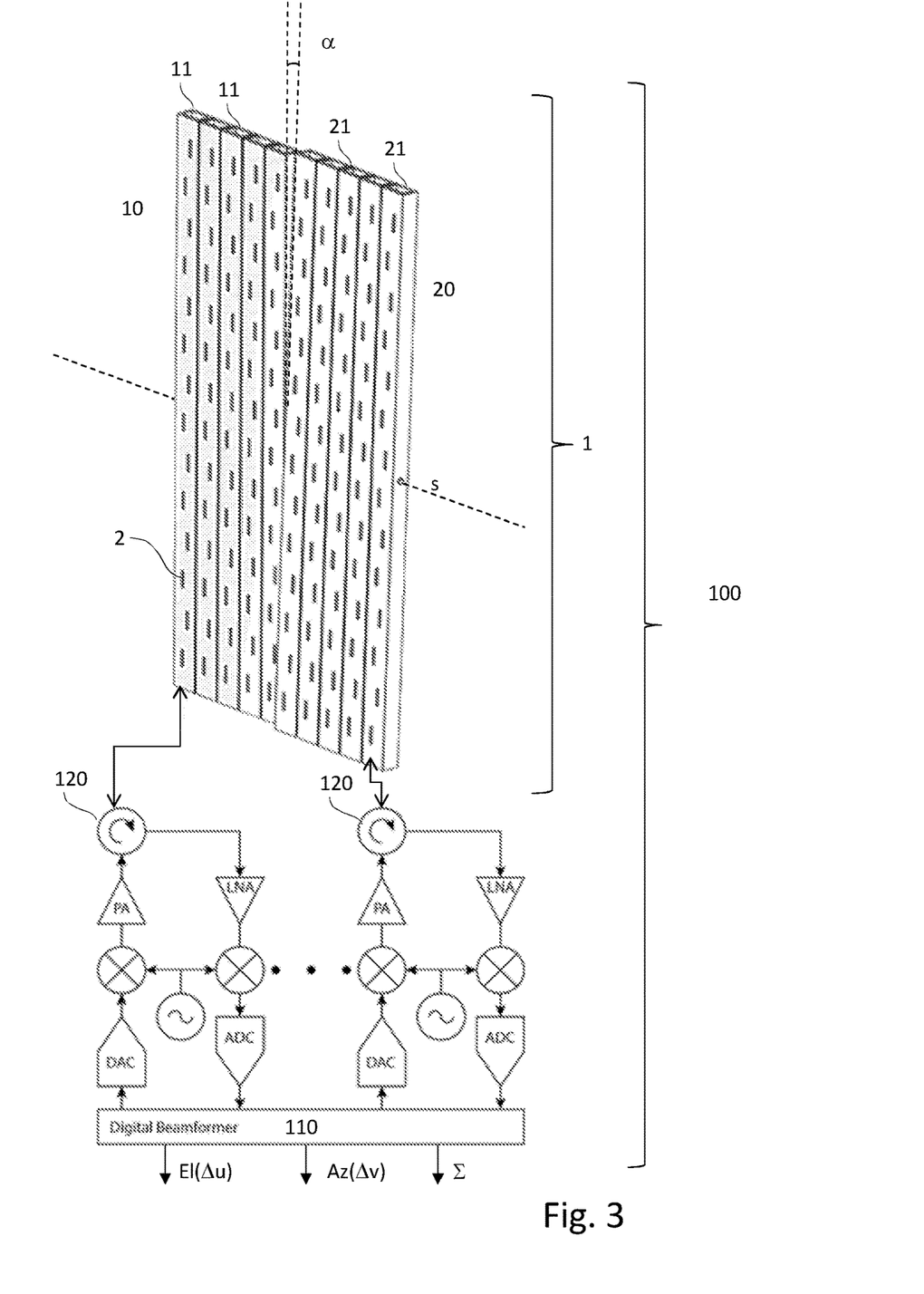
FIG. 3 illustrates in a combined perspective and schematic view an embodiment of a phased array antenna system (100) comprising an antenna array (1) similar to the one in FIG. 2, where an end of each of the slotted waveguides are connected to a digital beam former (110) via individual circulators (120). The output from the digital beam former may be antenna gain for the sum lobe (E) and differential gains in the Elevation and Azimuth directions, El(Δu), Az(Δv).

Half the waveguides, represented by the first sub-antenna (10), point in a slightly different direction, e.g. slightly different elevation, than the other half represented by the second sub-antenna (20), as shown in FIG. 3.

This can be achieved with a mechanical split between the sub-antennas and arranging them in two different planes, as illustrated, or by a slight modification of the waveguides. The difference between the two sub antennas can be used to form a difference lobe with two boresights as shown in FIG. 3.

Added, the two sub antennas will have a high gain sum beam as seen in FIG. 5 with low side lobe level.

The two sub antennas (10, 20) can be used to form a monopulse receiver in the first boresight plane (BP1), in this example elevation.

The whole antenna system, sometimes called a sum beam, can by phase steering in a digital beam former (110) be used to form two receiver lobes pointing to both sides of a target. The difference between these two lobes will form a monopulse difference lobe in the second boresight plane (BP2), in this example the azimuth direction, as shown in FIGS. 6 and 7.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. An antenna array comprising:
a first and a second sub-antennas with respective first and second boresights, wherein the first sub-antenna comprises two or more first antennas, and the second sub-antenna comprises two or more second antennas, wherein a first boresight plane, the first boresight is mechanically tilted away from the second boresight about a common axis (s) of the first boresight plane and a second boresight plane associated with the second boresight, wherein the first boresight is tilted away from the second boresight a squint angle ($\alpha$) larger than 0 degree.

2. The antenna array of claim 1, wherein the two or more first antennas are planar in a first antenna plane and the two or more second antennas are planar in a second antenna plane, wherein the first antenna plane is tilted relative to the second antenna plane.

3. The antenna array of claim 1, wherein the two or more first antennas are arranged interleaved with the two or more second antennas.

4. The antenna array of claim 1, wherein the two or more first antennas are arranged adjacent each other.

5. The antenna array of claim 1, wherein said first antennas are slot antennas.

6. The antenna array of claim 5, wherein said one or more first antennas are slotted waveguide antennas, each with two or more slots.

7. The antenna array of claim 1, wherein the first boresight is tilted away from the second boresight a squint angle ($\alpha$) between 0.001 and 1 degree.

8. The antenna array of claim 1, wherein the first boresight plane is the elevation plane.

9. A phased array antenna system comprising an antenna array according to claim 1, wherein the phased array antenna system comprises a beamformer connected to each of said two or more first antennas and two or more second antennas.

10. The phased array antenna system of claim 9, wherein the beamformer is arranged to feed each of said two or more first antennas and two or more second antennas with a common transmit frequency.

11. The phased array antenna system of claim 10, wherein said two or more first and second antennas are longitudinal slotted waveguide antennas and wherein a duplexer is connected to each of the slotted waveguide antennas and the beamformer is connected to two or more first and second antennas via the duplexers.

12. The phased array antenna system of claim 11, wherein the slotted waveguide antennas are end-fed.

13. The phased array antenna system of claim 11, wherein the beamformer is a digital beamformer.

14. The phased array antenna system of claim 9, wherein, the directionality of the phased array system is configured to be frequency controlled in the first boresight plane and phase controlled in a second boresight plane orthogonal to the first boresight plane.

15. The phased array antenna system according to claim 14, wherein the phased array antenna system is a Passive Electronic Steered Array (PESA) in the first boresight plane and an Active Electronic Steered Array (AESA) in the second boresight plane.

16. The phased array antenna system according to claim 14, wherein the phased array antenna system is a monopulse antenna system both in the first boresight plane and the second boresight plane.

17. The phased array antenna system according to claim 9, where the beamformer is configured to vary the transmit frequency to alter the direction of the first and second boresights in the first boresight plane.

* * * * *